United States Patent Office 3,432,483
Patented Mar. 11, 1969

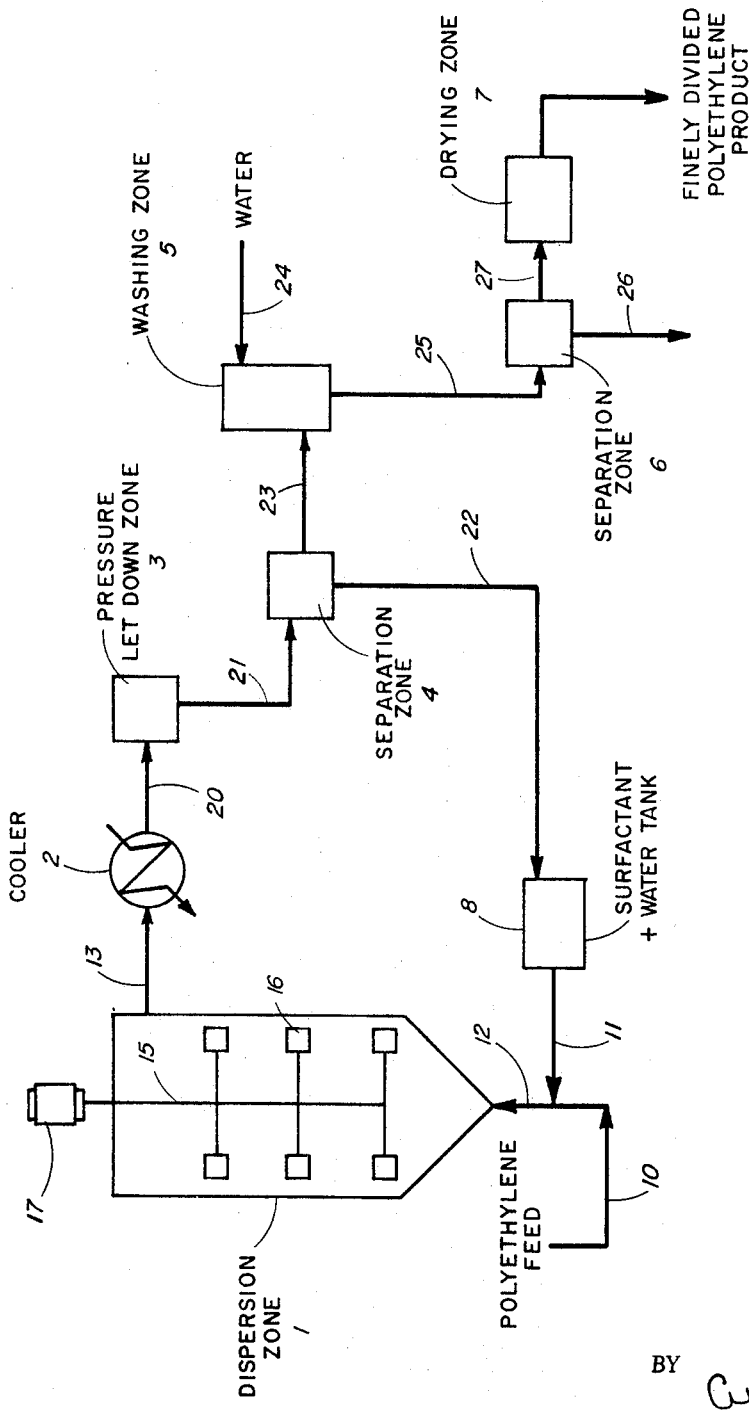

3,432,483
CONTINUOUS PROCESS FOR PREPARING FINELY DIVIDED POLYMERS
Leo C. Peoples and Charles W. Beatty, Cincinnati, Ohio, assignors to National Distillers and Chemical Corporation, New York, N.Y., a corporation of Virginia
Filed Feb. 18, 1965, Ser. No. 433,690
U.S. Cl. 260—87.3        12 Claims
Int. Cl. C08f 1/09, 3/20

ABSTRACT OF THE DISCLOSURE

A continuous process for the preparation of finely divided thermoplastic polymer such as polyethylene which comprises dispersing the polymer in water in the presence of a surfactant. More specifically, the process is carried out by feeding the polymer along with water and a surfactant to the lower portion of a dispersion zone, agitating the resulting admixture, to form a dispersion of a polymer, and withdrawing this dispersion from a point below the upper liquid level in the dispersion zone. The withdrawn dispersion is then cooled to solidify the finely divided polymer particles, reducing the pressure of the cool dispersion to ambient conditions, and then separating the finely divided polymer particles from the dispersion.

This invention relates to a novel continuous process for preparing finely divided, normally solid, synthetic organic polymeric thermoplastic resins. More particularly, this invention relates to a continuous aqueous dispersion process for preparing finely divided polyolefins, especially polyethylene.

Thermoplastic polymers in finely divided or powdered form have found use in a number of commercial applications where it is either impossible or inconvenient to utilize the conventional cube or pellet forms. For example, powdered thermoplastic polymers in dry form have been used to coat articles by dip coating in either a static or fluidized bed, by powder coating wherein the powder is applied by spraying or dusting, and by flame spraying. In dispersed form, thermoplastic polymer powders have been appllied as coatings by roller coating, spray coating, slush coating, and dip coating to substrates such as metal, paper, paperboard, and the like. Finely divided polymers have also been widely employed in conventional powder molding techniques. Other important applications of these polymer powders include paper pulp additive; mold release agent for rubber; additives to waxes, paints, polishes; binder for nonwoven fabrics, and the like.

Prior art processes for making finely divided thermoplastic polymers generally employ the cubes or pellets, which are obtained directly from the synthesis process. These processes are of three main types: mechanical grinding, solution, and dispersion.

In the first type, the polyolefin in granular form is passed through a high shear pulverizing device, e.g., a Pallmann grinder, to yield particles of irregular shape having diameters ranging from about 75 to 300 microns. In addition to requiring specially designed equipment, such processes yield powders which are not entirely suitable for fluidization or dispersion applications wherein spherical particles of narrow size distribution are required.

The second type of prior art process generally entails dissolving the polymer in a solvent, followed by precipitation of the polymer in finely divided form through addition of a nonsolvent or evaporation of the solvent or a combination of the two. Inherent in such a process are difficulties in manipulating the solvents, complete removal of the solvent from the product, and classifying the resultant powders. The powders from such process are of irregular, somewhat rounded shape and, consequently, possess only moderately satisfactory fluidization characteristics.

The third type of prior art process involves dispersion, under high shear agitation conditions, of a polymer in a liquid medium with the aid of various dispersing agents. From the standpoint of cost and simplicity of operation, water is generally the preferred dispersing medium. The dispersing agents usually comprise a soap such as sodium stearate or some other type salt. Processes wherein such agents are used generally require all or a portion of the dispersing agent to be incorporated into the polymer in a separate step preceding dispersion in water. Quite often this results in a powdered polymer product containing residual dispersing agents, which can create undesirable changes of the original polymer properties, e.g., increased water sensitivity, loss of electrical insulating values, etc. Moreover, the removal of such residues from the powdered polymer is generally difficult and often impossible. Another disadvantage of these dispersing agents is that they tend to become inactive at temperatures below which only relatively low molecular weight polyolefins are sufficiently fluid to be dispersible in water. Such prior art processes have generally been limited, therefore, to relatively low molecular weight polyethylenes.

A recently proposed process discloses that finely divided thermoplastic polymers can be prepared by means of an improved aqueous dispersion process. The resin feed is subjected to vigorous agitation in the presence of water and a block copolymer of ethylene oxide and propylene oxide as the dispersing agent at a temperature above the melting point of the resin and at a pressure sufficient to maintain the water in an aqueous state until a dispersion is produced and thereafter cooling said dispersion below the melting point of the resin. The continuous process of the present invention is particularly adapted to this improved aqueous dispersion process.

One object of the present invention is to provide a continuous process for the production of a finely divided thermoplastic polymer wherein said polymer is dispersed in the presence of water and a block copolymer of ethylene oxide and propylene oxide.

Another object of this invention is to provide a continuous aqueous dispersion process for the production of finely divided polyethylene of relatively high molecular weight.

A further object of this invention is to provide new and improved methods and equipment for preparing in a continuous manner on a commercial scale finely divided polyethylene in the form of a free flowing, non-agglomerated dry powder.

A still further object of this invention is to prepare, by a continuous process, a finely divided thermoplastic polymer, which is substantially devoid of particles larger than 500 microns and wherein the particles have a relatively narrow size range and are of spherical shape.

An additional and specific object of this invention is to prepare, by a continuous aqueous dispersion process, a finely divided, relatively high molecular weight polyethylene or copolymer thereof, which is substantially devoid of particles greater than 25 microns, wherein the average particle size is less than 10 microns and wherein the particles are of spherical shape.

These and other objects of the present invention will become readily apparent from the ensuing description and illustrative embodiments.

In accordance with the present invention, there has now been found a continuous process for the manufacture of finely divided thermoplastic polymers, e.g., polyethylene, which are characterized by a high degree of purity, spherical shape, and a particle size distribution that permits utilization in a variety of important commercial applications. In general, the continuous process of this invention comprises the following sequential steps:

(1) Subjecting an admixture of the thermoplastic resin feed material, water and a surfactant such as a block copolymer of ethylene oxide and propylene oxide to vigorous agitation in a dispersing zone under elevated temperature and pressure conditions;

(2) Continuously withdrawing a portion of the thus formed dispersion from the upper portion, but below the liquid level, of the dispersion zone;

(3) Rapidly cooling the withdrawn dispersion to a temperature which is at least below the melting temperature of the dispersed polymer;

(4) Rapidly reducing the elevated pressure under which the dispersion was formed and cooled to atmospheric pressure;

(5) Separating the finely divided polymer particles in a resulting slurry from the solution of water and surfactant;

(6) Recycling the recovered solution of water and surfactant either directly to the dispersion zone or to an intermediate water-surfactant feed tank;

(7) Washing the separated finely divided polymer particles to remove residual surfactant below contaminating levels;

(8) Separating the washed finely divided polymer particles from the wash solution; and (9) Drying the wet polymer particles to obtain substantially pure, spherical, finely divided polymer particles having the desired particle size distribution.

In most instances it has also been advantageous to screen the wet finely divided polymer particles prior to drying to remove any oversize particles or fine fibers which may be present. Moreover, the screened wet particles in the form of a wet cake may be utilized directly to make a water-dispersion which can be used in a number of commercial applications such as roll coating, spray coating, slush coating, and dip coating to substrates such as paper, paperboard, and concrete.

A number of essential features have been discovered with respect to the formation of the polymer dispersion and its recovery from the dispersion zone. To begin with, it has been found important to feed the polymeric material and the water solution of the surfactant, preferably in admixture, into the lower portion of the dispersion zone. Withdrawals from the dispersion zone are made at a point in the upper portion of the dispersion zone but below the upper liquid level of the dispersion mixture. If the feed materials are added to the upper portion of the dispersion zone and withdrawals are made from the lower portion, the resulting polymer particles do not have the desired particle size distribution and fibers are produced in the dispersion. It has also been found important to cool the withdrawn dispersion portion to temperatures below the melting point of the polymer prior to releasing the elevated pressures in order to maintain the spherical shape of the particles in the dispersion.

For a more complete understanding of this invention, reference will now be made to the accompanying drawing which is a schematic showing of one form of apparatus wherein the process may be carried out.

Referring specifically to the drawing, a relatively high molecular weight polyethylene is employed as the resin feed in conjunction with water as the dispersion medium and a block copolymer of ethylene oxide and propylene oxide as the surfactant or dispersant in accordance with one embodiment of the process of this invention.

The polyethylene resin is introduced to dispersion zone 1 via lines 10 and 12. This may also be accomplished by extruding the polyethylene directly into the bottom portion of dispersion zone 1 by utilizing a conventional extruder and die plate (not shown). The surfactant dissolved in water is transferred from tank 8 via lines 11 and 12 to dispersion zone 1. When an extruder die is employed, the aqueous solution of surfactant may also be fed through the die into dispersion zone 1.

In alternative embodiments of the present invention, the polymer, water and surfactant may be passed by separate feed lines into dispersion zone 1 or two of these materials, e.g., water and surfactant, may be premixed and then contacted with the third material in the dispersion zone.

The dispersion zone embodied herein comprises a vessel, preferably cylindrical, having a closed bottom and a closed top, means for controlling the temperature (not shown) inside of said vessel, such means being suitably in the form of a jacket or coil (not shown) for indirect temperature control of the vessel by passing a suitable liquid through said jacket or coil, inlet line 12 at the bottom of said vessel for introducing the feed materials into the interior of said vessel, an outlet line 13 in the wall of said vessel at an upper portion thereof but below the top of said vessel for removing dispersed polymer from the interior of said vessel, agitating means 15 adapted to vigorously mix the contents of said vessel, said means being suitably in the form of a rotatable impeller or a rotor acting cooperatively with a stator system integral with the inside walls of said vessel, indicating means (not shown) to indicate the liquid level, temperature, and pressure within said vessel, and a safety release venting means (not shown) at the top of said vessel for preventing undesirable pressure build-up within said vessel.

The dispersion zone is equipped with stirring means such as rotatable stirrer 15 upon which are mounted in spaced relationship turbine-type rotors 16. It will be understood that conventional stirring and agitation equipment may be employed provided that it is capable of producing the desired dispersion of the polymer in the aqueous medium. It is also helpful at times to place the stator blades (not shown) on the interior walls of the vessel to facilitate dispersion formation.

Stirrer 15 is driven by electric motor 17, although other driving means such as an air motor and the like could also be employed. In general, stirrer tip speeds are regulated between about 300 and 2700 ft./min.

In carrying out the process of this invention it is desirable, although not essential, to supply dispersion zone 1 with the polymer in the molten state and a hot water-surfactant solution. The polymer, e.g., polyethylene, and the water-surfactant solution are subjected to vigorous agitation, under conditions which will be subsequently described, to produce a dispersion of finely divided polyethylene in water. During dispersion, the liquid level in zone 1 is maintained above outlet line 13 in order to permit a continuous flow of the dispersion from the vessel. Dispersion flows from the vessel through line 13 into heat exchanger 2, wherein it is cooled rapidly by water to a temperature at least below the melting temperature of the dispersed polymer, for example, to a temperature below about 90° C. and preferably below 60° C., where low or medium density polyethylene is the dispersed polymer. From heat exchanger 2 the cooled dispersion flows via line 20 through a let-down valve (not shown) into a let-down tank 3.

This let-down system is so designed as to rapidly and efficiently transfer the product dispersion or slurry, which may in some instances be quite viscous, from the zone of elevated pressure present in the dispersion vessel to a zone of atmospheric pressure desired for subsequent separation steps. From let-down tank 3 the product slurry is pumped by means of a suitable pump, e.g., a diaphragm pump (not shown), to separation zone 4 via line 21 wherein the polymer particles are separated from the slurry. It is possible to employ various means of separating solid polymer from the slurry, e.g., solid bowl centrifuges, perforated basket centrifuges, continuous belt vacuum drum filters or string discharge vacuum filters.

The filtrates, comprising a water solution of surfactant, is recycled via line 22 to tank 8.

The wet polyethylene powder cake from separation zone 4 is passed via line 23 to washing zone 5 along with water added via line 24. The polyethylene powder is thoroughly washed by agitation supplied by a conventional agitating device (not shown) such as a three-bladed marine-type propeller or a "Shear Flow" mixer. Ratios of washing liquid to polyethylene powder are not critical for the removal of residual surfactant. Ratios used can conveniently range from about 2 to about 20, and preferably from about 3 to 6 parts by weight of washing liquid per part of polyethylene powder.

The effectiveness of surfactant removal appears to be a surface tension phenomenon. Generally, one washing is sufficient to reduce the surfactant content of the finely divided polyethylene to a suitably low level, e.g., to 0.5 wt. percent or less. Of course, it will be understood that more washings may be employed to achieve lower levels of residual surfactant, e.g., 0.2 wt. percent or less.

Selected organic solvents, e.g., acetone, methanol, ethanol, and the like, may be used in place of water as the wash liquid, if desired. However, such solvents should be limited to washing steps wherein it is not desired to recycle the resultant extract for reuse of surfactant. Residual surfactant contents below 0.10 wt. percent can be achieved by the use of organic solvents.

The slurry resulting from the washing zone 5 is transferred via line 25 to separation zone 6 wherein the solids are separated, for example, by filtering, centrifuging, or other means. The filtrate is removed via line 26 and may either be discarded or recycled to tank 8 if desired. The finely divided polyethylene particles are passed from separation zone 6 via line 27 to drying zone 7 which may comprise an air jet drier with this particular equipment the wet polyethylene particles or powder, which is continuously fed, is entrained in a rapidly circulating turbulent flow of hot air. In a first zone, any particle agglomerates are broken down to discrete particles, and in a second zone, any remaining agglomerates are stratified by centrifugal force and recirculated for further deagglomeration. Drying temperatures in an air jet drier are not critical; ranging in general from about room temperature up to the melting point of the polymer. For faster drying rates, the upper portion of this drying range is preferred. For example, low and medium density polyethylenes are preferably dried at a temperature of about 80° to 110° C. The resultant dried product is obtained directly as a powder in which all of the particles are discrete.

Other types of driers may also be used, e.g., a rotary vacuum tumble drier, a tray oven drier, a fluidized bed drier, a rotary tube hot air drier, etc. These driers, however, are less preferred than the air jet drier as they tend to leave an undesirable quantity of aggolmerates in the dry powder, requiring an additional grinding or milling step, e.g., in a hammer mill, to yield products composed entirely of discrete particles.

Flow properties of the dry powder product can be improved by the incorporation of an ultra-fine, inert powder such as a form of silica, commercially sold under such trade names as Santocel and Cab-O-Sil. Preferably, the ultra-fine powder is metered into the drier in a controlled manner along with the wet powder feed. A small amount of ultra-fine powder in relation to the finely-divided polymer produces a free-flowing product. For example, from about 0.1 to 2.0 wt. percent of ultra-fine powder, based on the weight of polyethylene being dried, produces a free-flowing polyethylene powder. Less than about 0.1 wt. percent of ultra-fine powder is ineffective in improving flow properties, whereas more than about 2% causes little additional improvement and tends to produce undesirable levels of contamination. The preferred range is from 0.5 to 1.0 wt. percent of the ultra-fine powder. Good flowability of the dry powder is beneficial, and often essential, to handling, for example, for uniform gravity feeding through hoppers.

In general, the polymers suitable for the practice of this invention include any normally solid, synthetic organic polymeric thermoplastic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrene, cellulosics, polyesters and fluorocarbons.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly(4-methyl-pentene), and the like. A preferred polyolefin feed is polyethylene, particularly polyethylene ranging in density from about .912 to .965 g./cc. Of special significance is the fact that the present process is not limited to the relatively low molecular polyethylenes of prior art processes, but is equally effective for relatively high molecular weight polyethylene as well as for polypropylene and other higher olefins.

Vinyl polymers suitable for use in this invention include polyvinyl chloride, polyvinyl acetate, vinyl chloride/vinyl acetate copolymers, polyvinyl alcohol, and polyvinyl acetal. Especially preferred is polyvinyl chloride.

Suitable olefin-vinyl copolymers include ethylene, vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. Especially preferred are ethylene-vinyl acetate copolymers wherein the ethylene constitutes a major portion of the copolymer, usually between about 51 and 96 percent.

Olefin-allyl copolymers include ethylene-allyl alcohol, ethylene-allyl acetate, ethylene-allyl acetone, ethylene-allyl benzene, ethylene-allyl ether, ethylene-acrolein, and the like. Ethylene-allyl alcohol is especially preferred.

Preferred among the polyamides are linear superpolylcarbonamide resins, commonly referred to as nylons. such polymers can be made by the intermolecular condensation of linear diamines containing from 6 to 10 carbon atoms with linear dicarboxylic acids containing from 2 to 10 carbon atoms. Equally well the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

The dispersing agents or surfactants employed in the present invention are water soluble block copolymers of ethylene oxide and propylene oxide. Preferably, they are water-soluble block copolymers of ethylene oxide and propylene oxide having a molecular weight above about 3,500 and containing a major portion by weight of ethylene oxide. Such compounds are both stable and effective as dispersing agents for the aforementioned thermoplastic polymers at temperatures ranging up to about 325° C. or higher, and more particularly at temperatures above about 160° C., especially at temperatures in the range of about 175° to 225° C. Representative of such compounds are several of the non-ionic surface active agents marketed by Wyandotte Chemicals prepared (see the Pluronic Grid Approach, vol. II, Wyandotte Chemicals Corp., 1957) by polymerizing ethylene oxide on the ends of a preformed polymeric base of polyoxypropylene. Both the length or molecular weight of the polyoxypropylene base and the polyoxyethylene end segments can be varied to yield a wide variety of products. For example, one of the compounds discovered as suitable for the practice of this invention is Pluronic F–98 wherein a polyoxypropylene of average molecular weight of 2,700 is polymerized with ethylene oxide to give a product of molecular weight averaging about 13,500. This product may be described as containing 20 weight percent of propylene oxide and 80 weight percent of ethylene oxide.

Examples of other effective Pluronics include P–105 (M.W. 6,500, 50% propylene oxide, 50% ethylene oxide), F–88 (M.W. 11,250, 20% propylene oxide, 80% ethylene oxide), F–108 (M.W. 16,250, 20% propylene oxide, 80% ethylene oxide), and P–85 (M.W. 4,500, 50% propylene oxide, 50% ethylene oxide). These compounds, containing at least about 50 weight percent of ethylene oxide and exhibiting a molecular weight of at least about 4,500, are particularly effective as dispersing agents for the aforementioned thermoplastic polymers.

It is also possible to employ Tetronics, marketed by the Wyandotte Chemicals Corp., as the dispersing agent or surfactant. Tetronics are prepared by building the ethylene oxide-propylene oxide block copolymer chains onto an ethylenediamine nucleus. It has been found that the Tetronics which are completely water-soluble, i.e., Tetronic 707 and Tetronic 908, are most effective for the present purposes. Tetronic 707 has a 30 wt. percent polyoxypropylene portion, of 2,700 molecular weight, polymerized with a 70 wt. percent oxyethylene portion to give an overall molecular weight of 12,000. Tetronic 908, on the other hand, has a 20 wt. percent polyoxypropylene portion, of 2,900 molecular weight, polymerized with an 80 wt. percent oxyethylene portion to give an overall molecular weight of 27,000. In general, the preferred Tetronics will have a molecular weight above about 10,000 containing a major proportion by weight of ethylene oxide.

The novel dispersing agents of the present invention, by functioning effectively from temperatures as low as the melting point of low density polyethylene, i.e. about 115° C., up to as high as 325° C., are not limited to the dispersion of low molecular weight low density polyethylenes. For example, high molecular weight low density polyethylene, linear polyethylene, polypropylene, polyvinyl chloride, ethylene-vinyl acetate copolymers, ethylene-allyl alcohol copolymers, nylon, and the like which either do not melt or which exhibit melt flow rates (ASTM D–1238–57T (2160 g. load)) below about 15 at temperatures below 160° C. can be readily dispersed by means of the subject novel dispersing agents to dispersions substantially devoid of particles larger than 500 microns and wherein the particles have a relatively narrow size range. Where it is desired to prepare the finest dispersion of a given polymer, for example, olefin homopolymers and olefin copolymers having an average particle size below about 10 microns, the dispersion temperature should be such that the resin being dispersed exhibits a melt flow rate of greater than 15, and, more preferably, greater than 20. Where larger average particle sizes are desired or acceptable, however, dispersion temperatures may be employed, still in combination with only relatively mild agitation, at which the polymer exhibits a melt flow rate appreciably lower than 15, for example, as low as about 2.

The dispersion vessel or device may be any device capable of delivering at least a moderate amount of shearing action under elevated temperatures and pressures to a liquid mixture. Suitable, for example, are the rotor-stator system described above, as well as conventional propeller stirrers. The average particle size of the product is somewhat dependent on the agitation. The average particle size of the product decreases with an increase in the impeller tip speed to a minimum and then the average particle size increases rapidly with an increase in the impeller tip speed. The dispersions of this process are generally produced at impeller tip speeds of about 300 ft./min. and higher. It is preferred to employ impeller tip speeds in the range of about 300 to 2700 ft./min., particularly in the range of 400 to 800 ft./min. Using such rates, polyethylene powders having average particle sizes of less than 25 microns, and particularly less than 10 microns can be produced. Preferred stirring periods generally will range from about 1 to 20 minutes, and preferably from about 5 to 12 minutes.

The amount of water introduced into the dispersion zone will range from about 0.33 to 9 parts by weight per part of normally solid polymer, preferably between about 0.8 and 4 parts per part of polymer. To prepare dispersions which are more dilute, it is usually more economical to dilute a more concentrated dispersion. Dispersions containing more than about 55 percent and especially more than about 75 percent of polymer are generally quite viscous and difficult to handle in a piping system. To a limited extent the dispersion produced in the dispersion reactor tends to become finer as the concentration of polymer increases, other conditions being held constant.

As little as 0.5 to as much as about 50 parts by weight of dispersing agent per 100 parts of normally solid polymer may be used to produce the desired dispersions. However, it is preferred to use from about 2 to about 30 parts of dispersing agent per 100 parts of polymer. Within these ranges the amount of dispersing agent exhibits no significant influence on the fineness of the dispersion.

The pressure under which the present process is carried out is normally equal to the vapor pressure of water at the operating temperature so as to maintain a liquid water phase in the dispersion reactor. In general, the pressures may range from about 1 to 217 atmospheres, and particularly from about 6 to 120 atmospheres. In cases where the polymer is sensitive to air at the elevated dispersion temperature, an inert gas, e.g., nitrogen or helium, may be injected into the reactor and deaerated water used.

The finely divided polymer product obtained in accordance with the aforedescribed continuous process is in the form of a powder of fine particle size and narrow particle size distribution. Generally, all of the dispersed particles have diameters less than 500 microns. By varying the composition of the subject novel dispersing agents, the impeller tip speed, and the ratio of polymer to water, average particle size ranging from about 300 microns to as low as 5 microns or below can be obtained. Especially preferred are particles of narrow size distribution wherein the number of average particle size is less than 20 microns, and more desirably less than 10 microns. Generally, as the ratio of ethylene oxide to propylene oxide is increased in the dispersing agents and the ratio of polymer to water is increased, the average particle size is decreased. Further and unexpectedly, the particles of the subject process are almost perfect spheres. The spherical shape contributes superior fluoridization characteristics, a shorter melting time, and improved dispersibility to the pulverulent compositions. Consequently, the finely divided polymers of this invention are superior in powder form for static or fluidized dip coating, spraying, dusting, and flame spraying applications as well as for preparing stable dispersions in water or some other medium for use in roller, dip, or spray coating. The relatively high molecular weight polymers of this invention also find use in the preparation of heat resistant coatings, in the preparation of molded or formed shapes by powder or slush molding techniques, and in the preparation of foams in combination with conventional blowing agents.

Shape and average size of the product powders were determined by microscopic analysis. A sample of the dispersion was diluted with water, and a drop of the diluted dispersion was placed under the microscope between a microscopic slide and a cover slip. By means of a calibrated ocular the sizes of 100 representative particles, well-distributed in the microscopic field (430× magnification) were measured. On the basis of duplicate counts, results are expressed in terms of the number average particle size.

To further illustrate the invention, the following examples are presented wherein all parts are by weight unless otherwise indicated.

Example I

During a 110 hour run, a polyethylene resin (density 0.915 g./cc.; melt index, 22 g./10 min.) in the molten state was fed into the bottom portion of dispersion zone 1. Concurrently with the polyethylene feed, water-surfactant feed solution was pumped from the water-surfactant feed tank 8 through a heat exchanger into dispersion zone 1.

The reactor product slurry had an average particle size of 8.9 microns with less than 2% of the particles greater than 25 microns. The particles were spherical in shape.

The dispersion zone product slurry was pumped from product let-down tank 3 to separation zone 4 provided with a perforated basket centrifuge. The filtrate solution recovered from the centrifuge was transferred to the water-surfactant feed tank 8. The wet cake was next charged to washing zone 5 and agitated with room temperature water using a 3 to 1 water to wet cake ratio with a Shear Flow mixer and a single three blade marine type propeller driven by an air motor, and the resulting slurry was pumped over a vibrating screener fitted with a 200 mesh screen. A water spray was used on top of the screening surface to increase the screening efficiency. The resulting slurry was transferred to separation zone 6, provided with a perforated basket centrifuge and the resulting wet cake dried in an air jet drier. The filtrate solution was discarded. The dry powder contained no agglomerates; it was in the form of discrete particles. All of the particles were substantially spherical in shape, and no change occurred in the particle size diameter of the particles as a result of the washing and drying steps.

The average operating conditions for this run are given below:

| | |
|---|---|
| Hours on stream _____hrs__ | 110.0 |
| Polyethylene feed rate _____lbs./hr__ | 26.8 |
| Water-surfactant solution feed rate __lbs./hr__ | 66.7 |
| Dispersion zone temperature _____° C__ | 207 |
| Reactor agitator tip speed _____ft./min__ | 515 |
| Dispersion zone retention time _____min__ | 6.0 |
| Polyethylene concentration in dispersion zone percent__ | 28.7 |
| Product slurry outlet temperature from heat exchanger 2 _____° C__ | 56 |
| Surfactant _____ | Pluronic F-98 |
| Surfactant concentration in water surfactant feed solution _____percent__ | 6.0–8.8 |
| Water-wet cake ratio (1 wash) _____ | 3 to 1 |
| Wash water temperature _____° C__ | 20 |
| Surfactant content of polyethylene after washing _____percent__ | 0.46 |
| Total drying time in air jet dryer _____hrs__ | 8.0 |
| Inlet air temperature to air jet dryer ____° C__ | 106 |
| Product air stream discharge temperature _° C__ | 55 |
| Wet cake feed rate (21.5% moisture) _lbs./hr__ | 200 |
| Final moisture content (Karl Fischer Method) _____p.p.m__ | 239 |

Data for two drying runs made with the wet cake using an air jet drier are presented below. In the second drying run, a small amount of powdered silica (Santocel) was fed cocurrent to the drier with the wet cake to produce a dry powder containing 0.5% silica. The increase in the free flowing ability of the dry powder containing silica is shown by the decrease in the percent retained on a 53 micron screen of an Air Jet Sieve after 30 minutes.

| | Run 1 | Run 2 |
|---|---|---|
| Silica used, lbs_____ | | 0.5 |
| Wet cake feed rate, lbs./hr_____ | 167 | 100 |
| Length of run, minutes_____ | 32 | 30 |
| Inlet air temp., ° C._____ | 93 | 82 |
| Product air stream discharge temp., ° C.___ | 49 | 46 |
| Sieveability (air jet sieve): Percent retained on 53 microns screen after 30 minutes____ | 80.7 | 1.0 |
| Moisture content, of wet cake, percent_____ | 25.8 | 25.8 |
| Moisture content, dry product, p.p.m. $H_2O$ (fusing method)_____ | 340 | 0 |

Example II

During a 20.3 hour run, a low melt index polyethylene (density, 0.924; melt index, 5.0 g./10 min.) resin in the molten state was fed to dispersion zone 1. Cocurrently with the polyethylene feed, a water-surfactant feed solution was pumped continuously from tank 8 through a heat exchanger and into the dispersion zone. The reactor product slurry had an average particle size of 13.7 microns with less than 3% of the particles greater than 25 microns. The particles were substantially spherical in shape.

The dispersion zone product slurry was pumped from product let-down tank 3 to separation zone 4 provided with a perforated basket centrifuge. The filtrate solution was recycled to water-surfactant feed solution tank 8. The wet cake was charged to washing zone 5 and agitated with room temperature water using a 3 to 1 water to wet cake ratio, and the resulting slurry pumped over a vibrating screen fitted with a 200 mesh screen. A water spray was directed on top of the screener to increase the screening efficiency. The diluted slurry was transferred to separation zone 6, and the resulting wet cake dried in air jet drier. The dry powder contained no agglomerates and was in the form of discrete particles of the same size characteristics as the reactor product slurry.

A summary of the average operating conditions is as follows:

| | |
|---|---|
| Hours on stream _____hrs__ | 20.3 |
| Polymer feed rate _____lbs./hr__ | 24.0 |
| Surfactant _____ | Pluronic F-98 |
| Water-surfactant solution feed rate _____lbs./hr__ | 58.0 |
| Surfactant concentration of water-surfactant solution _____percent__ | 6.8–7.7 |
| Polymer concentration in dispersion zone _percent__ | 29.2 |
| Dispersion zone temperature _____° C__ | 209 |
| Retention time in dispersion zone _____min__ | 7.1 |
| Agitator tip speed _____ft./min__ | 515 |
| Product slurry outlet temperature from heat exchanger 2 _____° C__ | 51 |
| Water-wet cake wash ratio (1 wash) _____ | 3 to 1 |
| Wash water temperature _____° C__ | 22 |
| Surfactant content of polymer after washing _____percent__ | 0.27 |
| Total drying time in air jet dryer _____hrs__ | 2.0 |
| Inlet air temperature to air jet dryer _____° C__ | 103 |
| Product air stream discharge temperature _____° C__ | 68 |
| Wet cake feed rate _____lbs./hr__ | 197 |
| Final moisture content (Karl Fischer) _____p.p.m__ | 127 |

Example III

During a 6.0 hour run, an ethylene-vinyl acetate copolymer resin (containing 14.2% vinyl acetate; density 0.939 g./cc.; melt index 7.0 g./10 min.) was fed to dispersion zone 1. Cocurrently with the polyethylene feed, a water-surfactant feed solution was pumped from tank 8 through a heat exchanger and into dispersion zone 1. The average operating conditions for this run are given below:

| | |
|---|---|
| Hours on stream _____hrs__ | 6.0 |
| Ethylene-vinyl acetate copolymer feed rate _____lbs./hr__ | 17.7 |
| Water-surfactant solution feed rate _____lbs./hr__ | 39.6 |
| Dispersion zone temperature _____° C__ | 218 |
| Reactor agitator tip speed _____ft./min__ | 515 |
| Retention time in dispersion zone _____min__ | 9.15 |

| | |
|---|---|
| Copolymer concentration in dispersion zone _____percent__ | 30.8 |
| Surfactant concentration in water-surfactant feed solution _____percent__ | 5.90 |
| Surfactant _____ | Pluronic F-98 |
| Product slurry outlet temperature from heat exchanger 2 _____° C__ | 51 |
| Water-wet cake wash ratio (2 washes) _____ | 5 to 1 |
| Wash water temperature _____° C__ | 20 |
| Drying time (rotary vacuum dryer at 27" Hg vacuum) _____hrs__ | 8.0 |
| Wet cake charge to dryer _____lbs__ | 46 |
| Drying temperature _____° C__ | 50 |
| Final water content of dry copolymer (fusing method) _____p.p.m__ | 359 |

The particles in the reactor product slurry had an average particle size diameter of 13.0 microns with less than 3% of the particles greater than 25 microns. The particles were spherical in shape. The reactor product slurry was pumped from let-down zone 3 over a vibrating screener fitted with 200 mesh nylon screen. The material passing through the screener was pumped to separarion zone 4 provided with a perforated basket centrifuge. The wet cake from separation zone 4 was charged to the washing zone 5 and agitated with cold water using a 5 to 1 water to wet cake ratio. The resulting slurry was pumped to separation zone 6, and the wet cake dried in a rotary vacuum dryer at a temperature of 50° C. To remove the agglomerates from the dry powder it was passed through a grinding mill. The ground powder had the same particle size characteristics as the reactor product slurry.

Example IV

During a 5.0 hour run a linear polyethylene resin (density, 0.965; melt index, 19.5 g./10 min.) was fed to dispersion zone 1. Cocurrently with the polyethylene feed, a water surfactant feed solution was pumped continuously from tank 8 through a heat exchanger and into the dispersion zone. The reactor product slurry had an average particle size of 11 microns with less than 4% of the particles greater than 25 microns. The particles were spherical in shape.

The dispersion zone product slurry was pumped from product let-down tank 3 to separation zone 4 provided with a perforated basket centrifuge. The filtrate solution recovered was transferred to the water-surfactant feed solution tank 8. The wet cake was charged to washing zone 5 and agitated with 66° C. water using a 5 to 1 water to wet cake ratio, and the resulting slurry then transferred from zone 5 to separation zone 6. The wet cake obtained from the reactor product slurry was washed a total of three times using the same operating conditions. The slurry from the last wash was pumped over a vibrating screener fitted with a 200 mesh screen, and the material passing through the vibrating screener was fed to separation zone 6. The wet cake from separation zone 6 was charged to rotary vacuum dryer and the dry powder passed through a grinding mill to remove the agglomerates. The ground powder had the same particle size characteristics as the reactor product slurry.

A summary of the average operating conditions is as follows:

| | |
|---|---|
| Hours on stream _____hrs__ | 5.0 |
| Polymer feed rate _____lbs./hr__ | 18.6 |
| Surfactant _____ | Pluronic F-98 |
| Water-surfactant solution feed rate _____lbs./hr__ | 48.6 |
| Surfactant concentration of water-surfactant solution _____percent__ | 6.0 |
| Dispersion zone temperature _____° C__ | 220 |
| Polymer concentration in dispersion zone _percent__ | 37.7 |
| Retention time in dispersion zone _____min__ | 7.5 |
| Agitator tip speed _____ft./min__ | 515 |
| Product slurry outlet temperature from heat exchanger 2 _____° C__ | 53 |
| Water-wet cake wash ratio (3 washes) _____ | 5:1 |
| Wash water temperature _____° C__ | 66 |
| Surfactant content of polymer after 3 washings _____percent__ | 0.30 |
| Drying time (rotary vacuum dryer at 27" Hg of vacuum) _____hrs__ | 9.0 |
| Wet cake charged to dryer _____lbs__ | 70 |
| Drying temperature _____° C__ | 66 |
| Final water content of dry polymer (fusing method) _____p.p.m__ | 250 |

Example V

The process of Example IV was repeated using a high melt index polyethylene (density, 0.926; melt index, 250 g./10 min.). The reactor product slurry had an average particle size of 9.2 microns with less than 3% of the particles greater than 25 microns.

Average operating conditions were as follows:

| | |
|---|---|
| Hours on stream _____hrs__ | 15.75 |
| Polymer feed rate _____lbs./hr__ | 15.9 |
| Surfactant _____ | Pluronic F-98 |
| Water-surfactant solution feed rate ___lbs./hr__ | 42.3 |
| Surfactant concentration of water surfactant feed solution _____percent__ | 5.7-5.9 |
| Dispersion zone temperature _____° C__ | 204 |
| Polymer concentration in dispersion zone percent__ | 27.3 |
| Retention time in dispersion zone _____min__ | 8.9 |
| Agitator tip speed _____ft./min__ | 515 |
| Product slurry outlet temperature of heat exchanger 2 _____° C__ | 48 |
| Water-solid wash ratio (3 washes)_____ | 5 to 1 |
| Wash temperature _____° C__ | 66 |
| Surfactant content of polymer after washing _____percent__ | 0.14 |
| Drying time (rotary vacuum dryer at 27" Hg vacuum) _____hrs__ | 7.0 |
| Drying temperature _____° C__ | 66 |
| Final water content of polymer (fusing method) _____p.p.m__ | 196 |

After passing the material from the rotary vaccum drier through a grinding mill to disintegrate the agglomerates, the dry powder was recovered in the form of discrete spherical particles having an average particle size of 9.2 microns and less than 3% of the particles greater than 25 microns.

The above data show that the process of this invention may be readily employed to produce finely divided polymer particles with excellent physical characteristics. Such products are capable of being effectively utilized in a variety of commercial applications such as those previously described.

While particular embodiments of this invention are shown above, it will be understood that the invention is obviously subject to variations and modifications without departing from its broader aspects. Thus, for example, one or more washing treatments may be employed to remove residual surfactant from the polymer particles. If a number of washing treatments are utilized, they may be carried out either in one washing zone or vessel or in a number of such zones with intermediate separation steps. Although the screening step is deemed to be optional, it may be employed either following the washing treatment or, if desired, as an intermediate in a series of washing treatments.

What is claimed is:

1. A continuous process for the preparation of finely divided, normally solid, synthetic organic thermoplastic polymers of mono-olefins and copolymers thereof which comprises the following sequential steps:
   (a) feeding to the lower portion of a dispersion zone thermoplastic polymer, water and a water-soluble block copolymer of ethylene oxide and propylene oxide surfactant;

(b) vigorously agitating the resulting admixture under elevated temperature and pressure conditions in said dispersion zone to form a dispersion of said polymer in molten state in said water;

(c) withdrawing a portion of the thus formed dispersion from the upper portion of said dispersion zone but below the upper liquid level of said dispersion in the dispersion zone;

(d) cooling the withdrawn dispersion portion to a temperature below the melting point of said polymer to form solid, finely divided polymer particles in the dispersion;

(e) reducing the pressure of said cooled dispersion to atmospheric pressure;

(f) separating the solid polymer particles from the surfactant solution phase of the thus treated dispersion;

(g) washing the separated polymer particles with a washing liquid to reduce the residual surfactant content below contaminating levels;

(h) drying the washed polymer particles; and (i) recovering dry, finely divided polymer particles therefrom.

2. The process of claim 1 wherein said polymer is polyethylene.

3. The process of claim 1 wherein said polymer is a copolymer of ethylene and vinyl acetate.

4. The process of claim 1 wherein the separated surfactant solution is recycled to the dispersion zone.

5. The process of claim 1 wherein said drying is carried out at an elevated temperature by air jet drying.

6. A continuous process for the preparation of substantially spherical, finely divided mono-alpha-olefin-polymer particles which comprises the following sequential steps:

(a) feeding to the lower portion of a dispersion zone molten mono-alpha-olefin-polymer and an aqueous solution of a surfactant comprising a block copolymer of ethylene oxide and propylene oxide;

(b) vigorously agitating the resulting admixture in said dispersion zone at a temperature above about 160° C. and a pressure above about 6 atmospheres to effect substantially complete dispersion of said molten polymer in an aqueous surfactant solution;

(c) withdrawing a portion of the thus formed polymer dispersion from the upper portion of said dispersion zone but below the upper liquid level of said dispersion in the dispersion zone;

(d) cooling the withdrawn dispersion portion to a temperature below the melting point of said polymer to form solid, finely divided polymer particles in the dispersion;

(e) reducing the pressure of said cooled dispersion to atmospheric pressure;

(f) separating the solid, finely divided polymer particles from the aqueous surfactant solution;

(g) washing the separated solid, finely divided polymer particles with a washing liquid to reduce the residual surfactant content below contaminating levels;

(h) drying the wet polymer particles at an elevated temperature by air jet drying; and (i) recovering substantially spherical, finely divided polymer particles.

7. The process of claim 6 wherein said polymer is polyethylene.

8. The process of claim 6 wherein said polymer is a copolymer of ethylene and vinyl acetate.

9. The process of claim 6 wherein said block copolymer has a molecular weight of at least 4,500.

10. The process of claim 6 wherein said washing liquid is water.

11. The process of claim 6 wherein the polymer particles are subjected to several washings to remove residual surfactant.

12. The process of claim 6 wherein the wet polymer particles are screened prior to drying to remove oversized particles.

References Cited

UNITED STATES PATENTS

| | | | |
|---|---|---|---|
| 2,921,920 | 1/1960 | Smith et al. | 260—29.6 |
| 2,947,715 | 8/1960 | Charlet et al. | 260—29.6 |
| 2,995,533 | 8/1961 | Parmer et al. | 260—29.6 |
| 3,322,720 | 5/1967 | Dempsey et al. | 260—94.9 |

FOREIGN PATENTS

| | | |
|---|---|---|
| 151,168 | 11/1950 | Australia. |
| 130,543 | 12/1948 | Australia. |

JOSEPH L. SCHOFER, *Primary Examiner.*

M. B. KURTZMAN, *Assistant Examiner.*

U.S. Cl. XR

260—94.9, 93.7, 29.6, 94.8, 92.8, 86.7, 89.1, 88.1, 87.1, 66, 91.3, 78, 80, 89.5